(12) United States Patent
Zeyfang

(10) Patent No.: US 8,733,404 B2
(45) Date of Patent: May 27, 2014

(54) THREADED PLUG FOR HAMMER UNION AND ASSEMBLY THEREOF

(75) Inventor: Frederick W. Zeyfang, Erie, PA (US)

(73) Assignee: Protective Industries, Inc., Buffalo, NY (US)

( * ) Notice: Subject to any disclaimer, the term of this patent is extended or adjusted under 35 U.S.C. 154(b) by 0 days.

(21) Appl. No.: 13/573,235

(22) Filed: Sep. 4, 2012

(65) Prior Publication Data
US 2014/0060689 A1    Mar. 6, 2014

(51) Int. Cl.
*F16L 55/10*    (2006.01)

(52) U.S. Cl.
USPC ............. 138/89; 138/96 T; 220/801; 220/802

(58) Field of Classification Search
USPC .......... 138/96 T, 96 R, 89; 220/801, 805, 802
See application file for complete search history.

(56) References Cited

U.S. PATENT DOCUMENTS

| | | | |
|---|---|---|---|
| 1,247,391 A | 11/1917 | Gill | |
| 1,269,875 A | 6/1918 | Stafford | |
| 2,277,713 A * | 3/1942 | Parker | 138/96 T |
| D136,659 S * | 11/1943 | Janning et al. | D9/439 |
| 2,627,877 A | 2/1953 | Phillips | |
| 2,702,565 A | 2/1955 | Moritz et al. | |
| 2,709,046 A * | 5/1955 | Hyde | 4/295 |
| 2,730,136 A | 1/1956 | Phillips | |
| D188,087 S | 5/1960 | Rowell | |
| 2,977,993 A | 4/1961 | Scherer | |
| 3,797,286 A * | 3/1974 | Saporito | 70/169 |
| 4,139,023 A | 2/1979 | Turley | |
| 4,185,665 A | 1/1980 | Flimon | |
| D261,418 S * | 10/1981 | Jackson | D23/261 |
| 4,342,337 A | 8/1982 | Underwood | |
| 4,429,719 A | 2/1984 | Mosing | |
| D284,604 S * | 7/1986 | Mathis | D23/260 |
| 4,701,089 A * | 10/1987 | Nettel | 411/373 |
| D344,242 S | 2/1994 | Weise et al. | |
| 5,316,045 A * | 5/1994 | Taylor | 138/89 |
| 6,367,508 B1 | 4/2002 | Richards et al. | |
| 7,281,546 B2 | 10/2007 | Goodson et al. | |
| D621,480 S * | 8/2010 | Campbell | D23/260 |
| 8,051,690 B2 * | 11/2011 | Camisasca | 70/232 |
| 2006/0278653 A1 | 12/2006 | Zeyfang et al. | |
| 2010/0163131 A1 | 7/2010 | Fehr et al. | |

OTHER PUBLICATIONS

CAPLUGS commercial plug for a hammer union Jul. 2011.

* cited by examiner

*Primary Examiner* — Patrick F Brinson
(74) *Attorney, Agent, or Firm* — Hodgson Russ LLP

(57) ABSTRACT

A threaded plug for use in connection with a hammer union is provided, the plug comprising a plug body cylindrical in configuration, the plug body having circumferential screw threads about at least a portion of the longitudinal extent of the body, a hand grip suitable for installing the thread plug accessible at an upper end, and the upper end having extending from the periphery thereof a downwardly obliquely oriented displaceable flange member. An assembly is also provided comprising the threaded plug installed on a nut of a hammer union and maintaining the nut in engagement with a male sub of a hammer union to provide protection of the screw threads of the nut and the end of the male sub.

7 Claims, 12 Drawing Sheets

Conventional Hammer Union Assembly

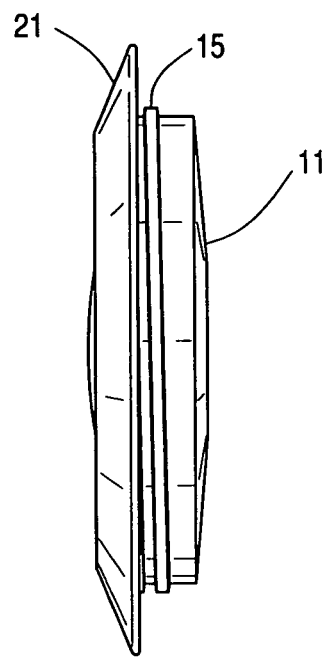
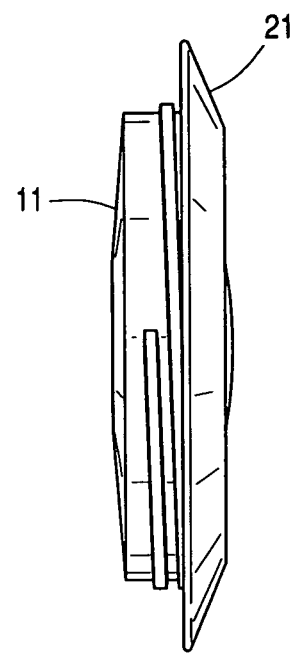
FIG. 6  FIG. 7
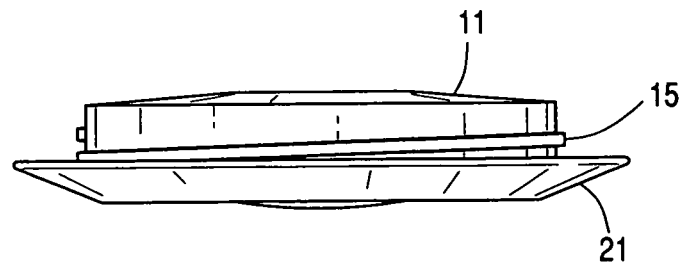
FIG. 8
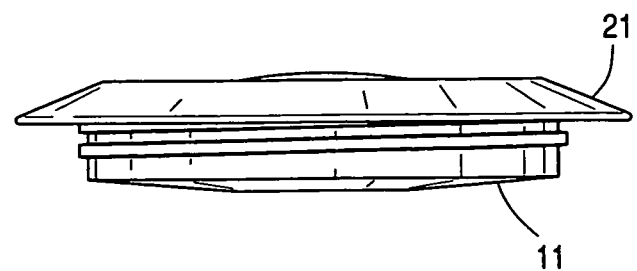
FIG. 9

THREADED PLUG FOR HAMMER UNION AND ASSEMBLY THEREOF

BACKGROUND OF THE PRESENT INVENTION

The present invention is directed to a threaded plug for use with a hammer union, and an assembly thereof with a hammer union, particularly for use with hammer unions used in high pressure piping for hydraulic fracturing of subterranean formations (or "fracking").

Natural gas is found in the pores of shale or coal, and it escapes through natural fractures. Surface deposits are relatively easy to recover with simple drilling. However, for the deepest and richest deposits, high pressure reduces the number of naturally occurring fractures and the rock's permeability is insufficient to extract much gas. Shale beds are often less than a hundred meters thick, so fracking boreholes are usually drilled horizontally to extend through as much of the bed lengthwise as possible. The boreholes are sealed with pipe. High pressure water, sometimes as high as 10,000 psi or greater, is then sent down this pipe. This system acts just like a hydraulic ram, where great force can be applied over a large area by introducing high pressure into the ram from a small entry point. This force splits the shale apart, creating numerous small fractures. Once done, extraction wells going straight down into the shale bed are far more productive, as the gas now has many free escape routes.

The hydraulic fracturing process requires many connections to be made from hydraulic fracturing pumping trucks (frac truck) to piping manifolds that connect to the well bore. The separate sections of pipe are connected by means of hammer unions. Hammer unions are designed to join separate sections of pipe without need of connecting flanges. Hammer unions are less expensive than flanged connections, and can generally be assembled more quickly.

Hammer unions are comprised of a male sub (or nut end), a female sub (or threaded end), and a threaded hammer nut which engages an annular flange on the male sub, and the screw threads on the female sub, to compress an internal seal assembly to prevent leakage and maintain a strong seal between the respective pipes. The seal assembly is generally an O-ring or lip seal that is inserted into the thread end of the hammer union and ultimately compressed.

Given the extremely high pressures employed during hydraulic fracturing, it is extremely important for the joint of the respective pipes to be sufficiently strong to counteract such pressures. The lack of a reliable high-pressure metal-to-metal seal (as is the case with a flange connection) has been cause for concern in the industry, as hammer union joints are more prone to high pressure failure than flange connections. One cause of possible failure of the hammer union seal is thread damage on the connecting surfaces, due possibly to repeated use and/or misuse and excessive handling and storage of the hammer union fitting, as well as damage to the sealing surfaces of the male and female subs. Avoidance of damage to the threaded nut and sealing surfaces reduces the possibility of injury to workers due to high pressure failure of the hammer union seal, as well as contamination of the environment due to leakage of hydraulic fracturing fluids.

A few types of hammer union plug protectors are commercially available. However, such commercially-available protectors are believed to be deficient from the standpoint of the overall protection provided.

OBJECTS AND SUMMARY OF THE INVENTION

There is thus a need to provide a protective device for a hammer union which protects both the threads of an associated nut and the end of the male sub portion of the hammer union.

In accordance with the present invention, there is thus provided a threaded plug for use in connection with a hammer union, the plug comprising:

a plug body being cylindrical in configuration, the plug body having circumferential screw threads about at least a portion of the longitudinal extent of said body, preferably terminating substantially at a lower end of the plug body, a hand grip suitable for installing said threaded plug accessible at an upper end of the plug body, and the upper portion having extending outwardly from the periphery thereof a circumferential downwardly obliquely oriented displaceable flange member.

In accordance with the present invention, there is also provided an assembly comprising a threaded plug, a male sub portion of a hammer union, and a threaded nut portion of a hammer union, the assembly comprising a threaded plug for use in connection with a hammer union, the plug comprising:

a plug body being cylindrical in configuration, the plug body having circumferential screw threads about at least a portion of the longitudinal extent of said body preferably terminating substantially at a lower end of the plug body, a hand grip suitable for installing said thread plug accessible from an upper end of the plug body, and the upper portion having extending outwardly from the periphery thereof a circumferential downwardly obliquely oriented displaceable flange member, a male sub portion of a hammer union assembly cooperatively engaged with a threaded nut having an exposed thread portion, the plug body being threaded onto the thread portion of the threaded nut in a manner sufficient to maintain the threaded nut in engagement with the male sub.

In a preferred embodiment, the upper portion of the plug body is open-ended and has a recessed portion such that at least a portion of the plug body is hollow, and the hand grip resides in the recessed portion.

BRIEF DESCRIPTION OF THE DRAWINGS

FIGS. 6-9 are side views of the threaded plug of FIG. 2.

DETAILED DESCRIPTION OF THE INVENTION

The present invention will be described in conjunction with FIGS. 1-28.

Figure 1:
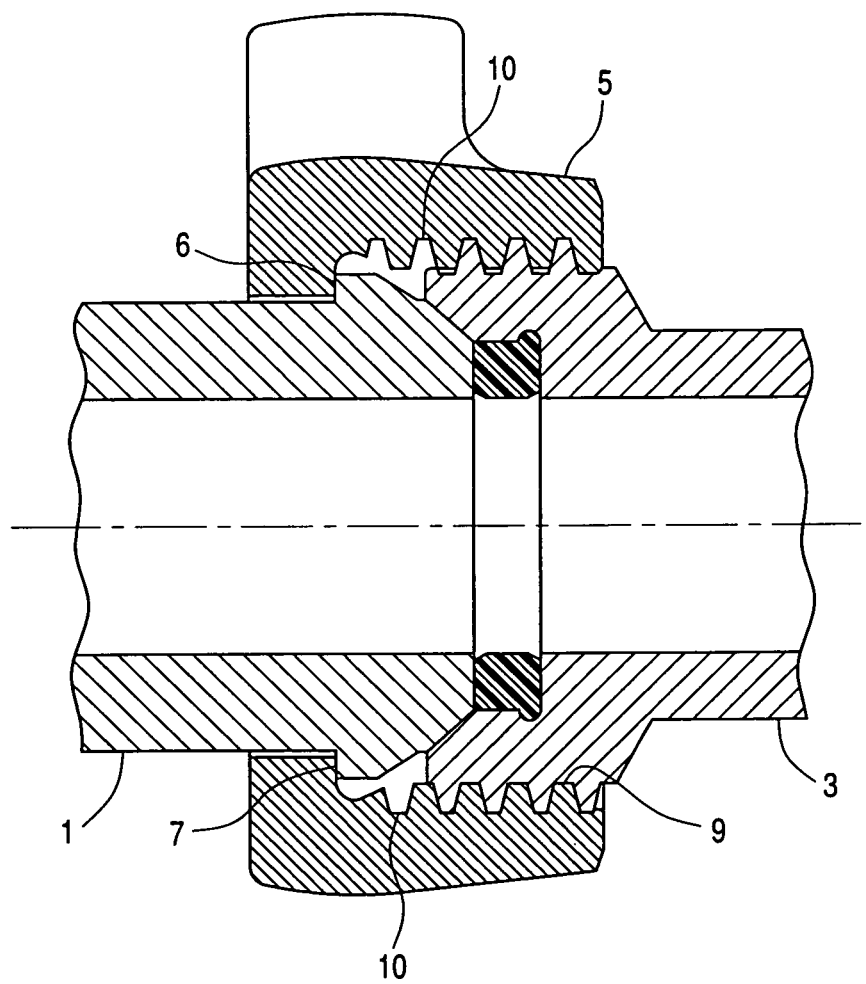
FIG. 1 depicts a conventional hammer union assembly connecting the opposing ends of pipes, depicting the male sub, the female sub, and threaded nut
Figure 2:
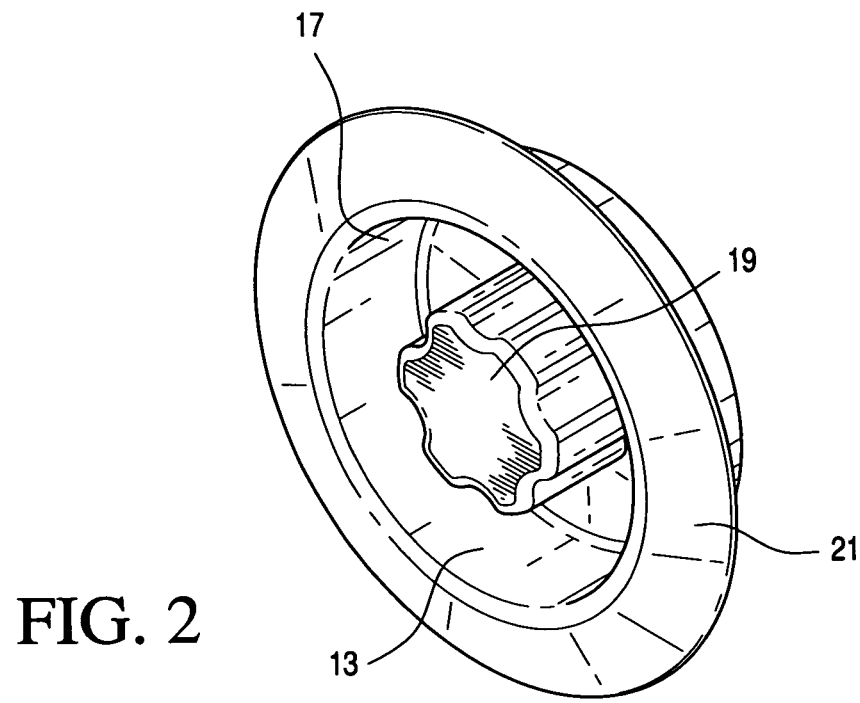
FIG. 2 is a top perspective view of an embodiment of the threaded plug of the present invention.
Figure 3:
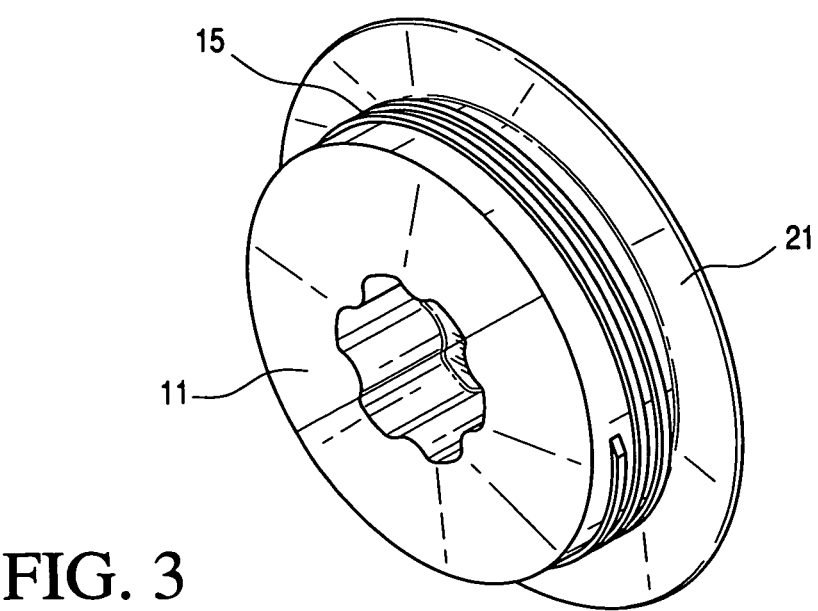
FIG. 3 is a bottom perspective view of the threaded plug of FIG. 2.
Figure 4:
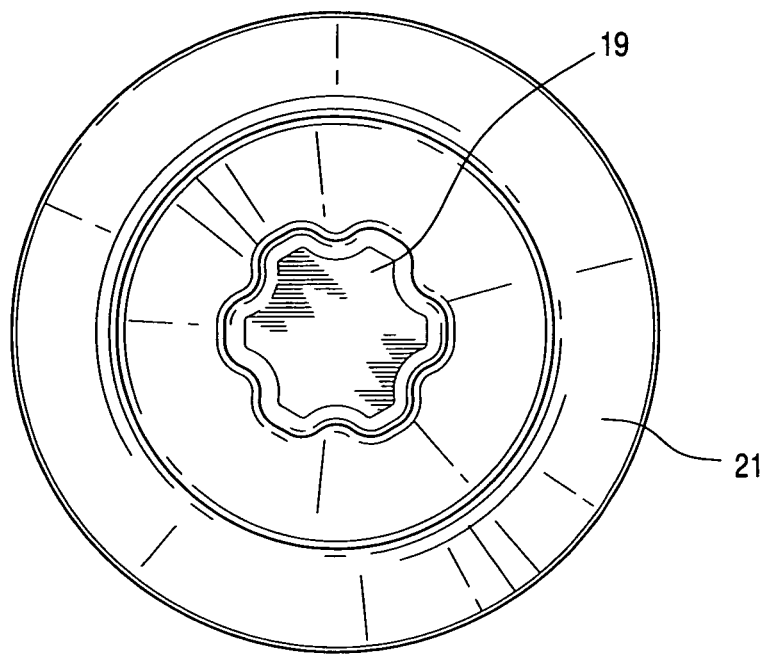
FIG. 4 is a top view of the threaded plug of FIG. 2.
Figure 5:
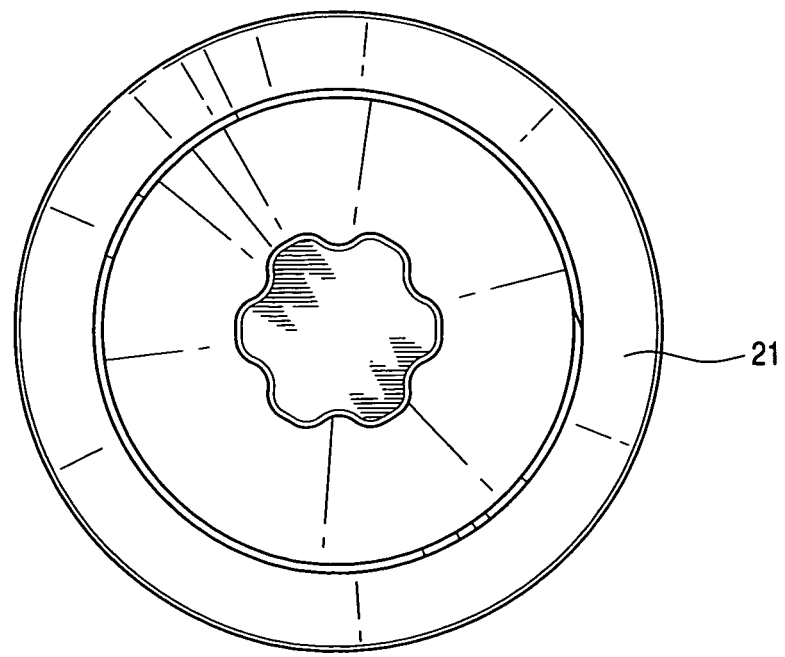
FIG. 5 is a bottom view of the threaded plug of FIG. 2.
Figure 10:
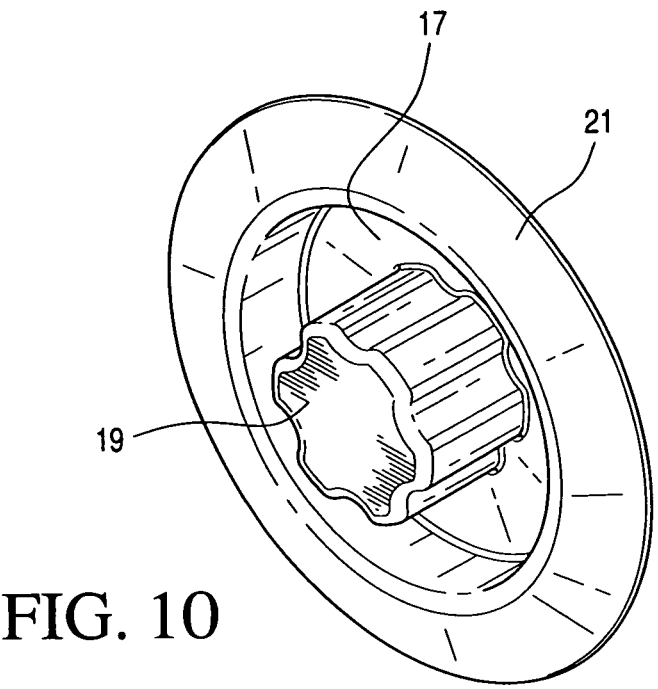
FIG. 10 is a top perspective view of another embodiment of the threaded plug of the present invention.
Figure 11:
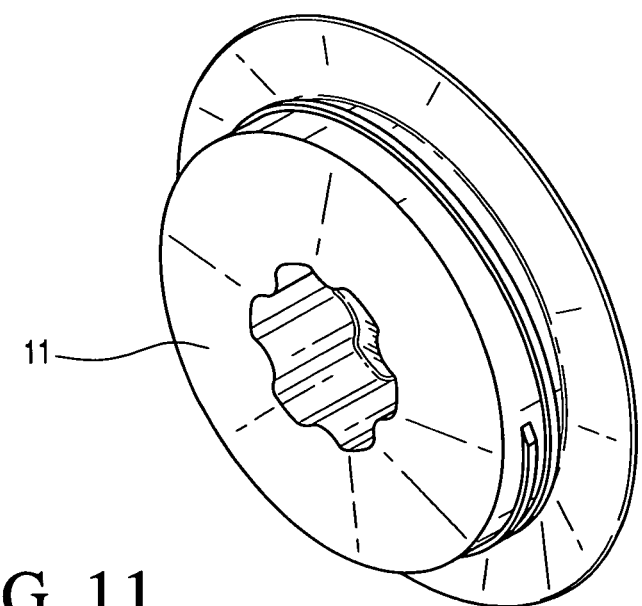
FIG. 11 is a bottom perspective view of the threaded plug of FIG. 10.
Figure 12:
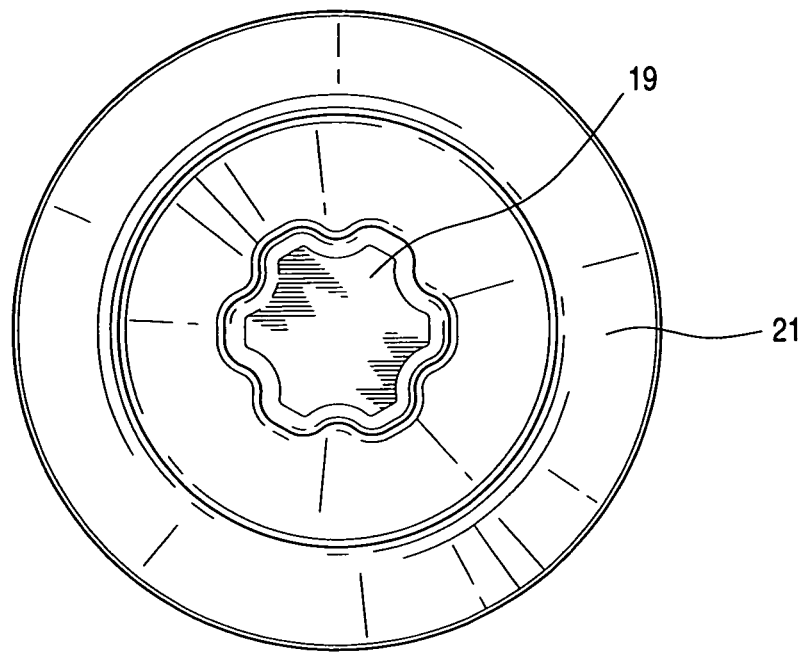
FIG. 12 is a top view of the threaded plug of FIG. 10.
Figure 13:
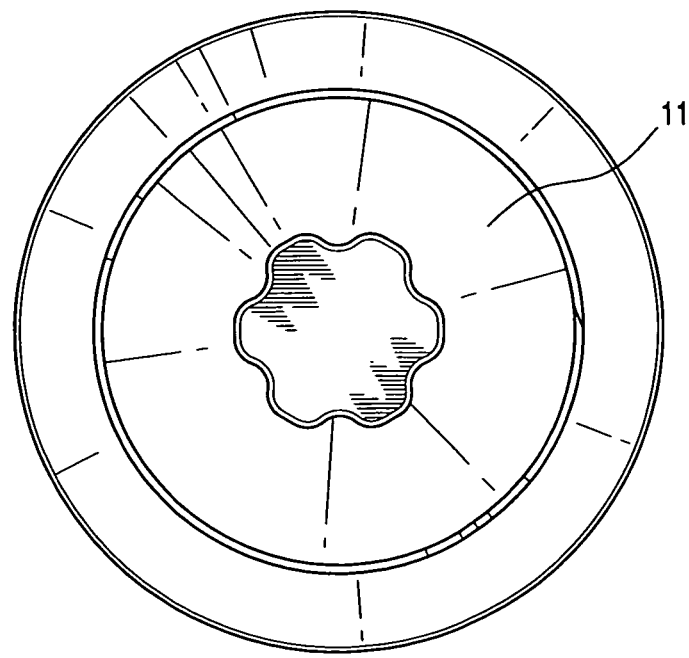
FIG. 13 is a bottom view of the threaded plug of FIG. 10.
Figures 14, 15:
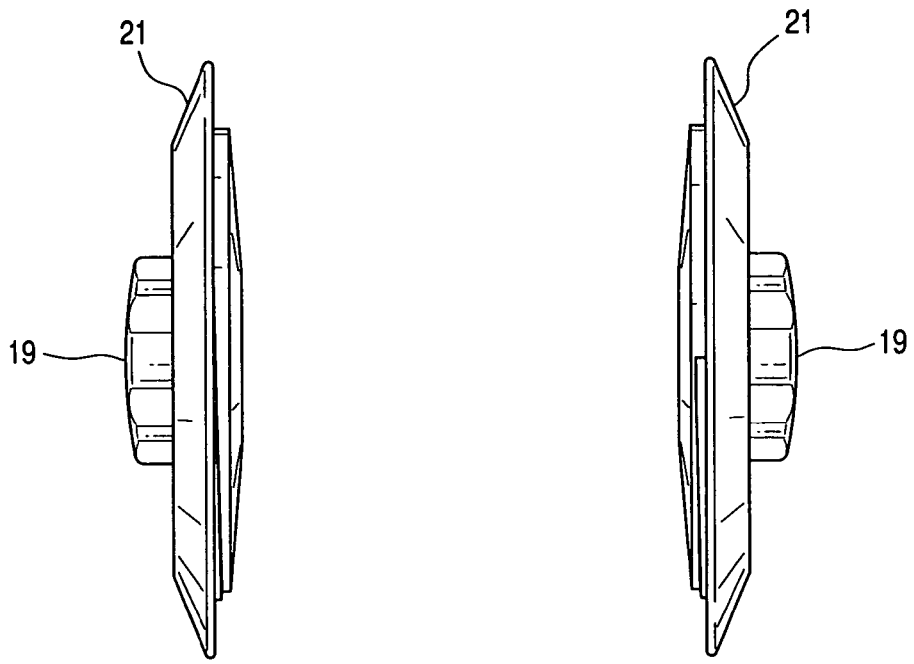
FIGS. 14-17 are side views of the threaded plug of FIG. 10.
Figure 16:
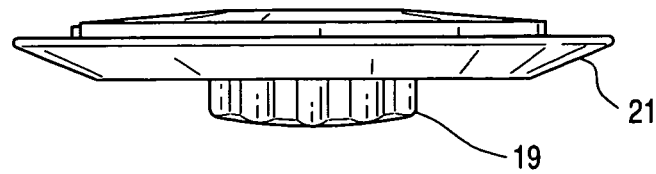
Figure 17:
Figure 18:
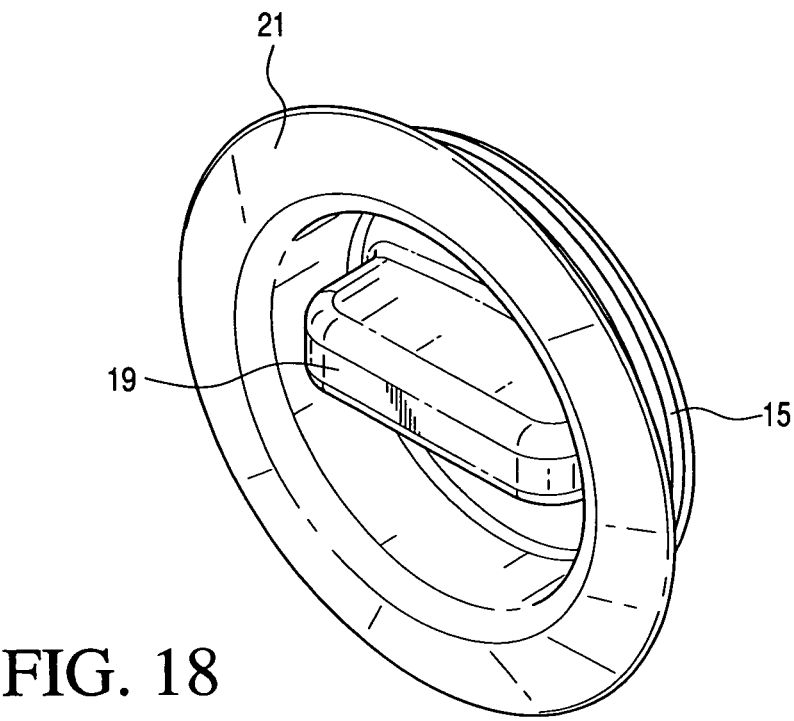
FIG. 18 is a top perspective view of another embodiment of the threaded plug of the present invention.
Figure 19:
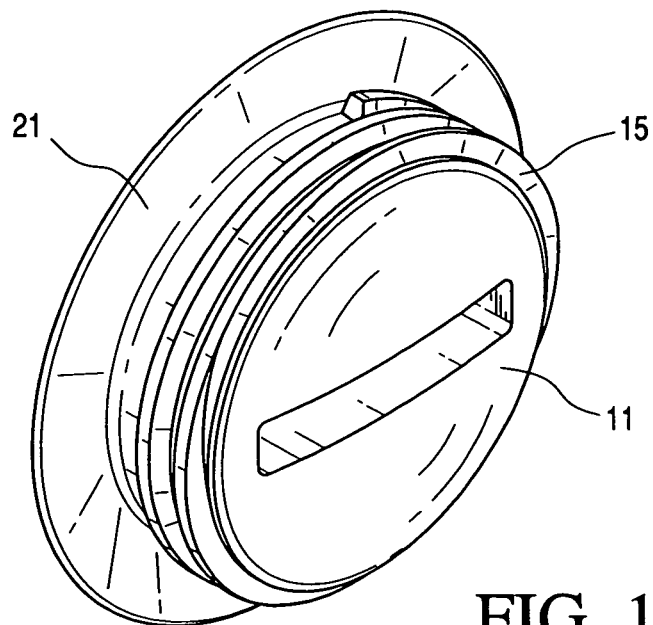
FIG. 19 is a bottom perspective view of the threaded plug of FIG. 18.
Figure 20:
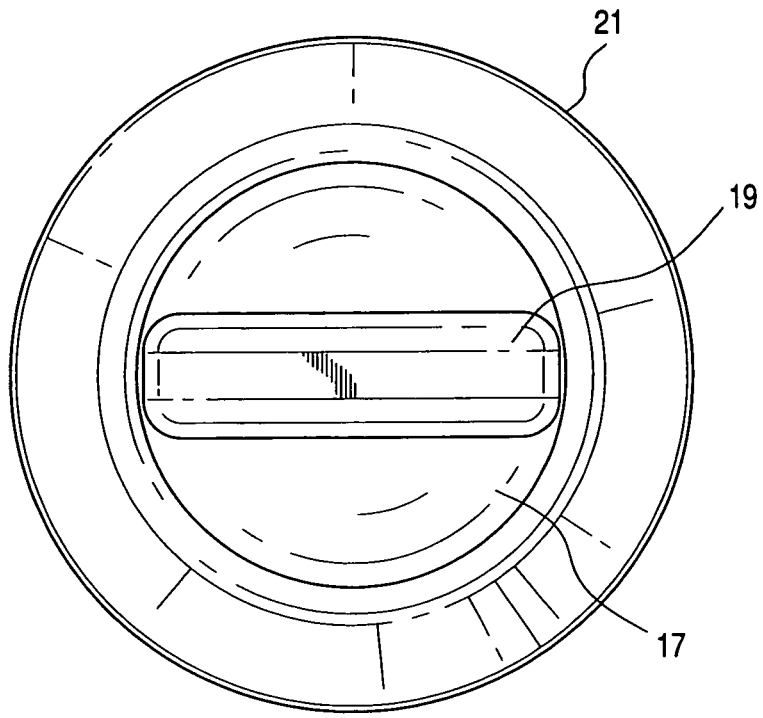
FIG. 20 is a top view of the threaded plug of FIG. 18.
Figure 21:
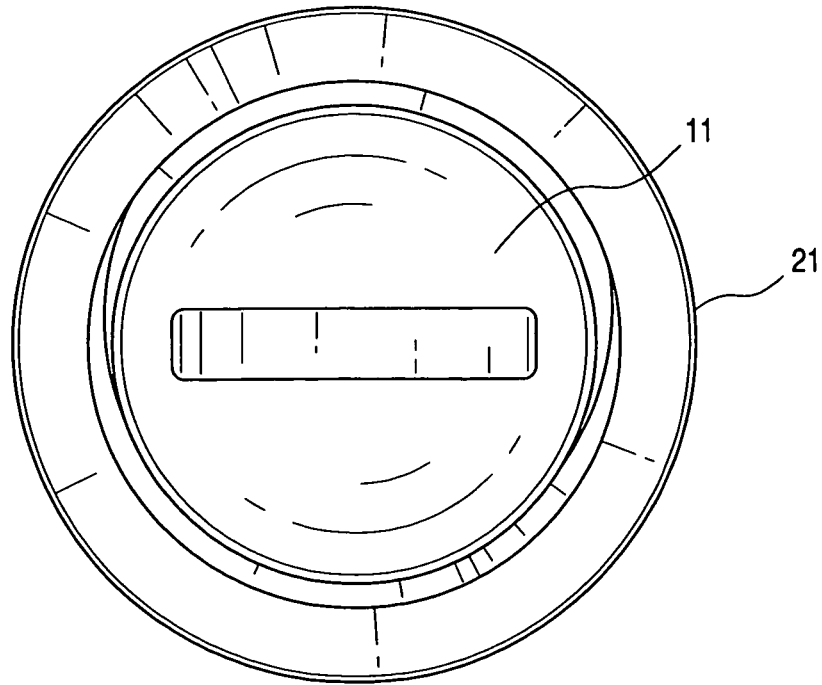
FIG. 21 is a bottom view of the threaded plug of FIG. 18.
Figure 22:
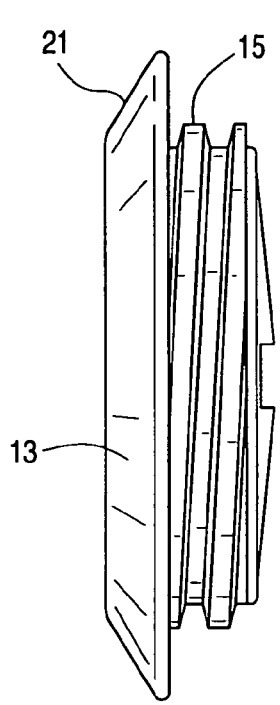
FIGS. 22-25 are side views of the threaded plug of FIG. 18.
Figure 23:
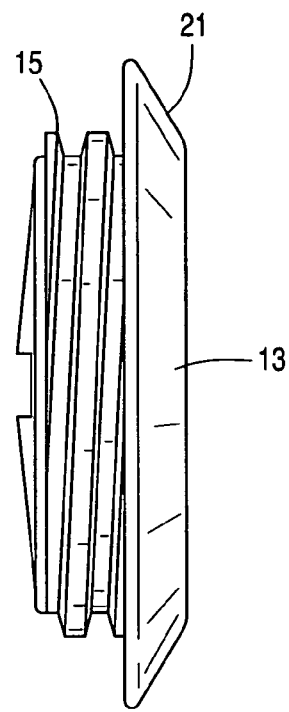
Figure 24:
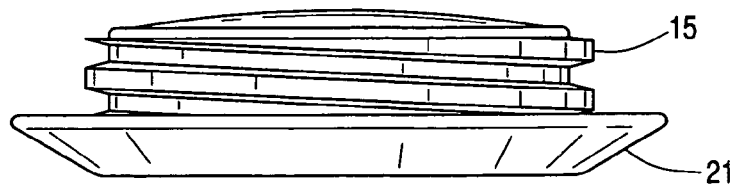
Figure 25:

The threaded plug of the present invention is used in connection with a male sub and threaded nut of a hammer union. A typical hammer union assembly is depicted in FIG. 1. The hammer union assembly comprises male sub 1, threaded female sub 3, and threaded hammer nut 5. In operation, the nut is placed about the male sub end of the pipe, and the female sub end placed into contact with the male end. The female end has screw threads 9, sized to engage with the threads 10 of the hammer nut, with the nut then being screwed onto the screw threads of the female sub. Since an annular internal shoulder 6 of the threaded nut is in abutting engagement with an external annular flange portion 7 of the male sub, the tightening of the threaded nut (upon being torqued or "hammered up") by engagement with the screw threads 9 of the female sub draws the male and female subs together. The fact that the end of the female sub is configured to receive a portion of an end of the male sub, together with the tightening of the nut about the female sub, and any sealing ring that is positioned therein, enables a properly sealed joint to be formed.

Figure 26:
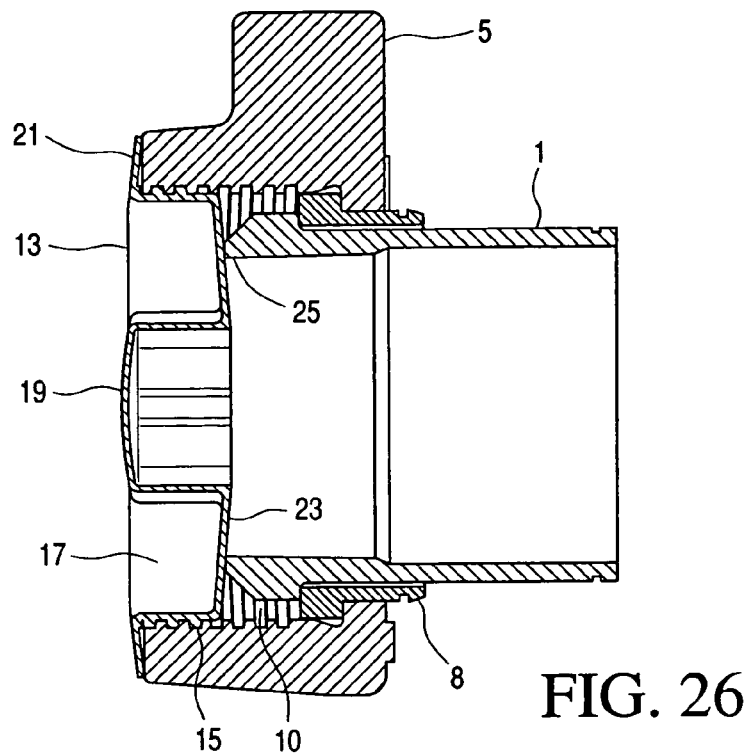
FIGS. 26-28 are cross-sectional views of the threaded plug of the present invention cooperatively engaged with a male sub and nut of a hammer union forming the assembly of the present invention.
Figure 27:
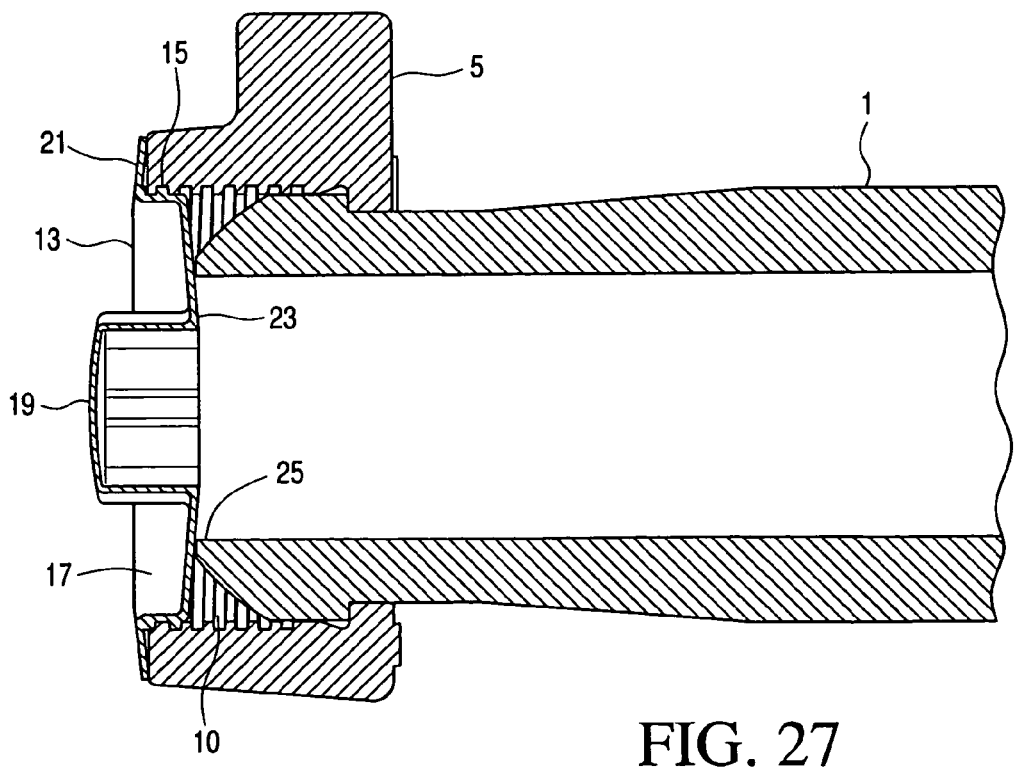
Figure 28:
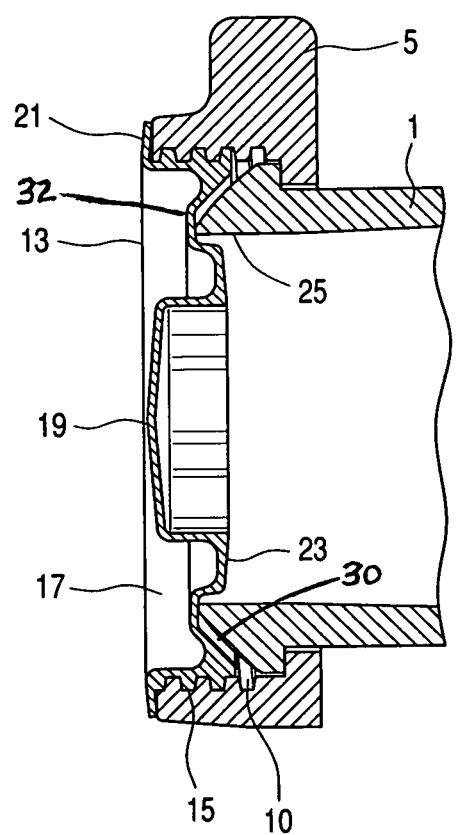

While FIGS. 1, 26 and 28 show an embodiment of the hammer union having an annular flange 7 of the male sub which engages the shoulder 6 of the threaded nut, in some instances an adapter collar 8 may be used as shown in FIG. 27. In either instance the function of the hammer union is the same.

The threaded plug of the present invention is intended to be used in connection with the nut and the male sub portion of the hammer union assembly, in order to protect both the screw threads of the nut, to keep debris and other contaminants away from the male sub and nut threads during transport and/or storage, to protect the sealing surface of the male sub, and to provide some impact protection for the exposed end of the nut. The threaded plug also advantageously maintains the nut in engagement with the male sub at the same time.

The threaded plug of the present invention comprises a plug body which is cylindrical in configuration. The plug preferably has a closed bottom portion 11 and an open (or hollow) top portion 13. The plug body has external circumferential screw threads 15 about at least a portion of the longitudinal extent of the plug body. The plug body is preferably substantially hollow as defined by a recessed portion 17. The screw threads may extend along the entire longitudinal extent of the plug body, or along only a portion of the plug body. The screw threads preferably terminate substantially at the lower or bottom end of the plug body.

The plug body includes a hand grip 19 accessible at the top or upper portion of the plug body, and is configured for gripping by the installer so as to permit installation of the threaded plug on the threaded portion of the nut. If the plug body is hollow as depicted in the Figures, the hand grip extends within the hollow portion and is accessible therein. The hand grip may lie within the recessed portion (if present), and may also extend from the recessed portion.

While FIGS. 3, 5, 11, 13, 19 and 21 depict a recessed portion in the bottom of the threaded plug, such bottom portions are still considered to be a "closed" end, as such recessed portions as shown are formed as a result of the molding process which forms the corresponding hand grip 19, and the plug still functions to seal the bore of the male sub.

The open end of the plug body has extending outwardly from a periphery thereof a circumferential flange 21. The flange in an unstressed position preferably extends downwardly toward the bottom end of the plug body at an oblique angle to the longitudinal axis of the plug body. The circumferential flange is sufficiently flexible such that, upon the plug body being screwed onto the threaded nut, the circumferential flange is caused to be flexed against a circumferential surface of the end of the nut in protective abutting relationship thereto. The flange subsequently remains under tension or stress during use. This enhances the degree of protection afforded by the threaded plug, as the seal provided by the circumferential flange is maintained in place.

The hand grip 19 may take any suitable form. Exemplary forms are depicted in the drawings, including a fluted cylindrical knob (FIGS. 2-17), and a rectangular-shaped grip (FIGS. 18-28). Other configurations may be used, as long as they may be gripped by the end user. As shown in the Figures, the hand grip may extend above an upper end of the threaded plug, or terminate within a recessed portion of the threaded plug, so as to not extend beyond the end of the plug. Neither embodiment is critical to practice of the present invention, as the particular embodiment employed is dependent upon the desires of the end user.

Use of the threaded plug of the present invention is shown by FIGS. 26-28, wherein the threaded plug is screwed onto the threaded portion of the threaded nut 5, which maintains the threaded nut 5 in contact with the male sub 1 due to the axial forces resulting from the engagement of the threaded plug and the threaded nut. As shown in FIGS. 26 and 27, upon engagement of the threaded plug with the threaded nut, a bottom portion 23 of the threaded plug is caused to abut the end 25 of the male sub, sealing the end of the male sub and providing protection thereto.

The length of the threaded portion of the threaded plug may vary depending upon the circumstances of use. For instance, the longitudinal extent of the threaded portion of FIG. 26 is longer than that shown in FIG. 27. Sufficient thread should be present to ensure that the plug is able to be adequately connected to the threaded nut to avoid becoming dislodged from the nut. The ability of the threaded plug to be threaded upon the nut may be restricted by the length of the male sub in relation to the nut. For instance, in the FIG. 26 embodiment, substantial threads are exposed in the nut for engagement with the threaded plug of the present invention. However, in the embodiments of FIGS. 27 and 28, fewer threads are available. One way to increase the number of threads that may be engaged by the threaded plug is shown in FIG. 28 and discussed below.

As shown in FIG. 28, the bottom portion of the threaded plug may have such dimension as to extend beyond the end of the male sub. In such circumstance, more threads of the threaded nut may be engaged by the threaded plug, strengthening the engagement of the plug with the nut. As shown in FIG. 28, the bottom portion 23 of the plug, upon the plug being threaded upon the nut, lies within the open end of the male sub. Hand grip 19 as shown lies beneath the top portion 13 of the threaded plug, with circumferential flange 21 being forced downward onto the circumferential edge of the threaded nut. In FIG. 28, a bottom portion of the plug includes a peripheral oblique surface 30 extending upwardly toward the upper portion of the plug and which dimensionally corresponds to and seats on or adjacent to an oblique outer end surface of the male sub. At the lower terminus of the oblique surface, the threaded portion of the plug extends vertically in a manner which permits engagement with the adjacent threaded portion of the threaded nut.

In the embodiment of FIG. 28, a grooved portion 32 is formed between the upper terminus of the oblique surface 30 and the hand grip portion. The end of the male sub seats within the grooved portion 32 to assist in locking the plug in place on the end of the male sub when fully threaded onto the adjacent threads of the nut. However, while the hand grip of FIG. 28 is shown to reside within the recessed portion of the plug, due to the end of the male sub fitting within the grooved portion in the plug, it is also acceptable for there to be no groove, such that the hand grip may be caused to extend upwardly from the recessed portion such as shown in FIG. 27.

Various modifications of the threaded plug of the present invention may be made without departing from the intent of the present invention. For instance, while the threaded plug as depicted has a hollow end, from which a hand grip extends, the threaded plug need not be hollow, but may be formed as a solid plug. In such an embodiment, the hand grip would extend from one end, with the plug still having threaded portions and an outwardly extending flange consistent with the invention. The only disadvantage would be the use of additional material and the associated cost that would result. Also, it may be less desirable to have the hand grip extend from the plug body, instead of being positioned within the hollow cavity of the plug.

The threaded plug of the present invention may be formed of any suitable material and method (injection molding, dip molding, etc.) that enables the objects of the present invention to be achieved. Flexible PVC (Polyvinyl Chloride) (85 Shore A) is the preferred material due to a combination of economics and material properties. Flexible PVC allows the pre-loaded sealing flange to conform to the hammer union nut surface and the plug surface to cradle the male sub and prevent the hammer union assembly from damage. Other exemplary flexible materials that may be employed include thermoset elastomers (Nitrile, EPDM, HNBR, Butyl, etc,), urethane, and thermoplastic elastomers.

What is claimed is:

1. An assembly comprising a threaded plug, a male sub portion of a hammer union, and a nut portion of a hammer union, said assembly comprising
    a threaded plug for use in connection with a hammer union, said plug comprising:
    a plug body being cylindrical in configuration, said plug body having circumferential screw threads about at least a portion of the longitudinal extent of said body,
    a hand grip suitable for installing said threaded plug accessible at an upper end of said plug body, and
    said upper end having extending outwardly from the periphery thereof a circumferential downwardly obliquely oriented displaceable flange member,
    a male sub portion of a hammer union assembly cooperatively engages with a nut having an exposed thread portion,
    said plug body being threaded onto said thread portion of said nut in a manner sufficient to maintain said nut in engagement with said male sub and to force said flexible flange against an end of said threaded nut.

2. The assembly of claim 1, wherein said upper end of said body includes a recessed portion such that at least a portion of the plug body is hollow.

3. The assembly of claim 2, wherein said hand grip resides within said recessed portion.

4. The assembly of claim 2, wherein said hand grip extends from said recessed portion.

5. The assembly of claim 2, wherein said recessed portion extends substantially the entire longitudinal extent of said plug body.

6. The assembly of claim 2, wherein said recessed portion is cylindrical in configuration.

7. The assembly of claim 1, wherein said lower end of said plug body includes a peripheral oblique surface which extends upwardly toward said upper end and terminating at said screw threads.

* * * * *